United States Patent [19]

Iitsuka

[11] Patent Number: 5,313,443
[45] Date of Patent: May 17, 1994

[54] DATA PLAYBACK APPARATUS FOR REALIZING HIGH TRANSFER RATE

[75] Inventor: Hiroyuki Iitsuka, Osaka, Japan

[73] Assignee: Matsushita Electric Industrial, Co., Ltd., Osaka, Japan

[21] Appl. No.: 964,469

[22] Filed: Oct. 21, 1992

Related U.S. Application Data

[63] Continuation of Ser. No. 648,109, Jan. 31, 1991, abandoned.

[30] Foreign Application Priority Data

Feb. 1, 1990 [JP] Japan ................... 2-22432
Feb. 1, 1990 [JP] Japan ................... 2-22433

[51] Int. Cl.⁵ .................. G11B 15/52; H04N 5/76
[52] U.S. Cl. ..................... 369/50; 369/32; 369/48; 360/77.01; 358/342
[58] Field of Search ............ 369/50, 48, 32, 47, 369/13, 58, 33, 44.27, 44.28, 44.29, 44.35, 54, 30, 34, 36, 124; 358/342, 335, 343; 360/48, 73.3, 73.01, 19.1, 73.02, 73.04, 78.04, 73.05, 73.08, 10.1–10.3

[56] References Cited

U.S. PATENT DOCUMENTS

| | | | |
|---|---|---|---|
| 4,706,134 | 11/1987 | Jinguji | 358/343 |
| 4,707,818 | 11/1987 | Suzuki et al. | 369/59 |
| 4,829,497 | 5/1989 | Sako et al. | 369/48 |
| 4,873,679 | 10/1989 | Murai et al. | 369/50 |
| 4,977,550 | 12/1990 | Furuya et al. | 369/50 |
| 5,010,539 | 4/1991 | Terashima et al. | 369/50 |
| 5,097,349 | 3/1992 | Nomura et al. | 369/48 |

FOREIGN PATENT DOCUMENTS

| | | |
|---|---|---|
| 165320 | 12/1985 | European Pat. Off. |
| 242215 | 10/1987 | European Pat. Off. |
| 277019 | 8/1988 | European Pat. Off. |
| 59-178607 | 10/1984 | Japan . |
| 0167472 | 7/1988 | Japan ............ 369/50 |

OTHER PUBLICATIONS

Patent Abstracts of Japan, vol. 14, No. 004 (P-986) 9 Jan. 1990, & Jp-A-1 256063 (Pioneer Electron Corp) 12 Oct. 1989, * the whole document *.
Patent Abstract of Japan, vol. 10, No. 243 (P-489) 21 Aug. 1986, & JP-A-61 73274 (Pioneer Electronic Corp) 15 Apr. 1986, * the whole document *.

Primary Examiner—Aristotelis Psitos
Assistant Examiner—Thang V. Tran
Attorney, Agent, or Firm—Lowe, Price, LeBlanc & Becker

[57] ABSTRACT

A data playback apparatus for reproduction of data from a recording medium in which digital data are serially and successively recorded. The data playback apparatus is equipped with a control unit which controls a reproduction unit for reproducing data from the recording medium. The control unit determines a predetermined condition such as presence or absence of requirement of a real-time data reproduction on the basis of control information which is recorded together with the data in the recording medium. In accordance with the predetermined condition, the control unit controls the reproduction unit so as to change the reproduction speed of the data from the recording medium, thereby realizing a high transfer rate in reproduction.

5 Claims, 5 Drawing Sheets

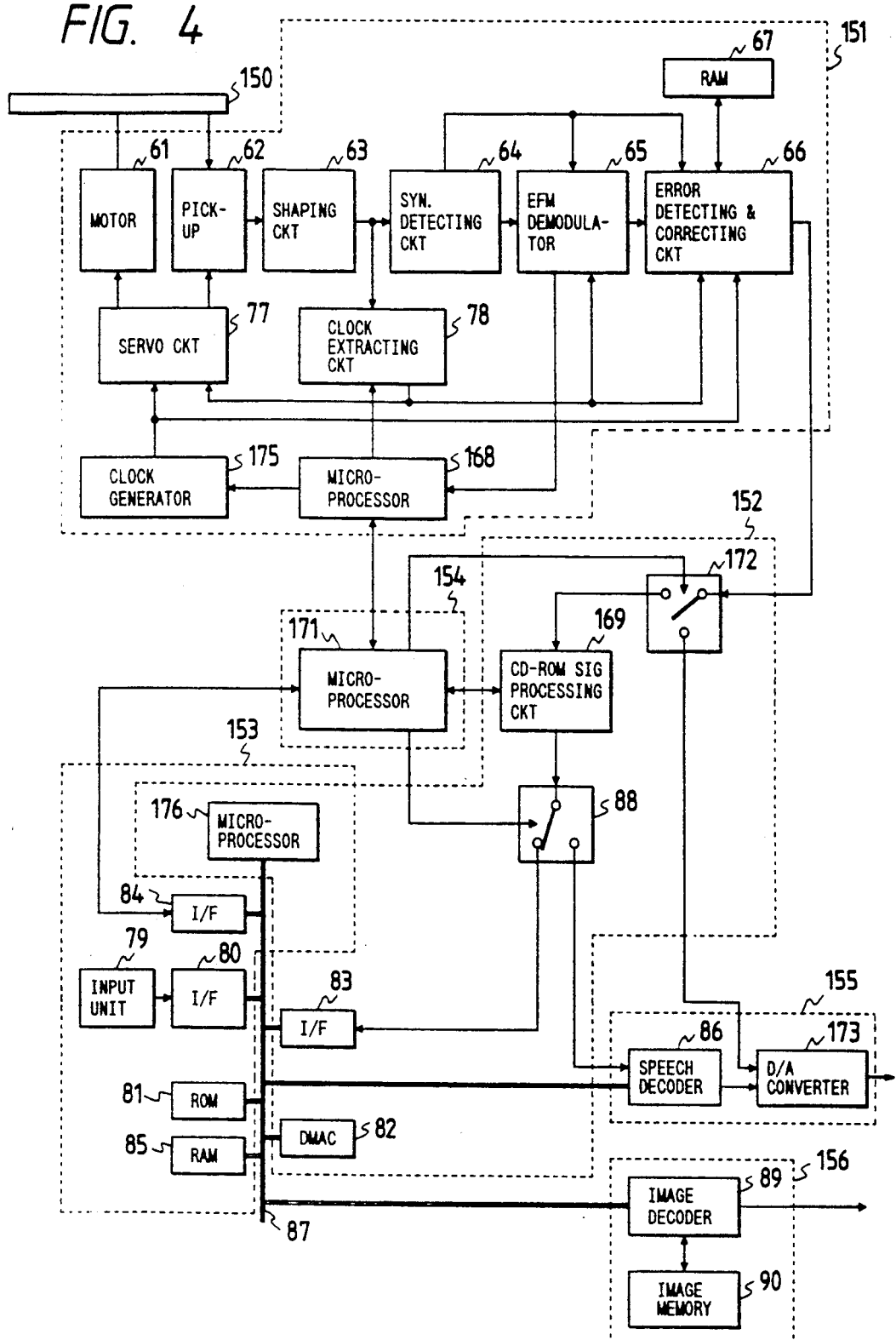

FIG. 5A
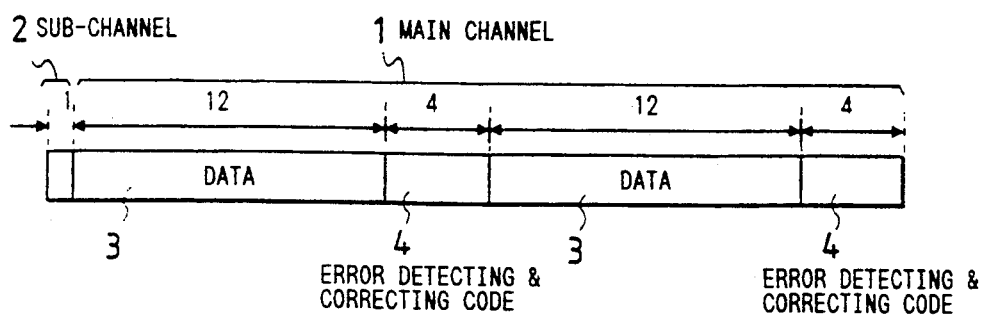
FIG. 5B
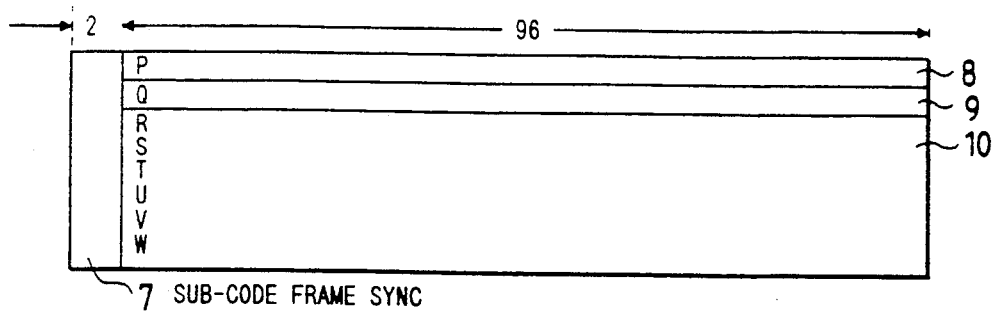
FIG. 5C
|    | 0 | 1 | 2 | 3 | 4 | 5 | 6 | 7 | 8 | 9 | 10 | 11 | 12 | 13 | 14 | 15 |
|----|---|---|---|---|---|---|---|---|---|---|----|----|----|----|----|----|
|    | CONTROL | | | | ADR | | | | TRACK NO. | | | | | | | |
| 16 | POINT | | | | | | | | MIN | | | | | | | |
| 32 | SEC | | | | | | | | FRAME | | | | | | | |
| 48 | 0 | 0 | 0 | 0 | 0 | 0 | 0 | 0 | PMIN | | | | | | | |
| 64 | PSEC | | | | | | | | PFRAME | | | | | | | |
| 80 | CRC | | | | | | | | | | | | | | | |
FIG. 5D
|    | 0 | 1 | 2 | 3 | 4 | 5 | 6 | 7 | 8 | 9 | 10 | 11 | 12 | 13 | 14 | 15 |
|----|---|---|---|---|---|---|---|---|---|---|----|----|----|----|----|----|
|    | CONTROL | | | | ADR | | | | TRACK NO. | | | | | | | |
| 16 | INDEX | | | | | | | | MIN | | | | | | | |
| 32 | SEC | | | | | | | | FRAME | | | | | | | |
| 48 | 0 | 0 | 0 | 0 | 0 | 0 | 0 | 0 | AMIN | | | | | | | |
| 64 | ASEC | | | | | | | | AFRAME | | | | | | | |
| 80 | CRC | | | | | | | | | | | | | | | |

FIG. 6A
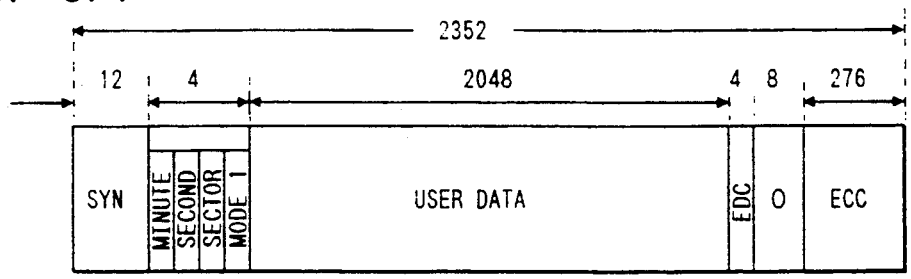
FIG. 6B
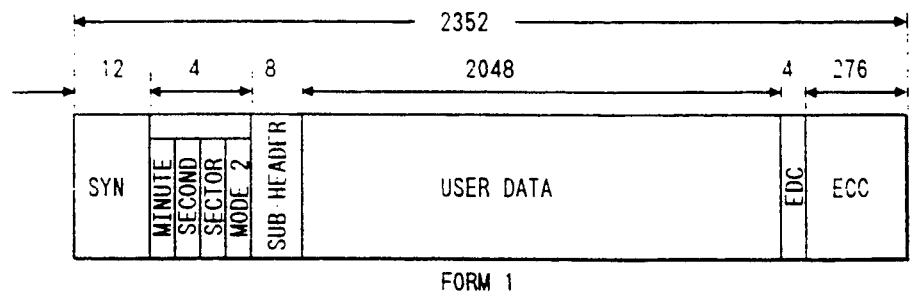
FORM 1
FIG. 6C
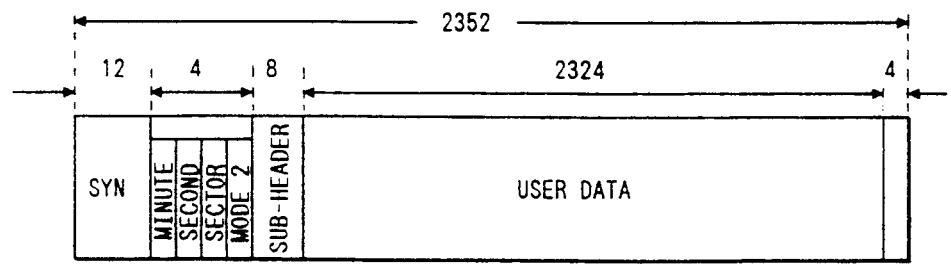
FORM 2
FIG. 6D
| BYTE NO. | |
|---|---|
| 0, 4 | FILE NUMBER |
| 1, 5 | CHANNEL NUMBER |
| 2, 6 | SUB-MODE |
| 3, 7 | CODING INFORMATION |
FIG. 6E
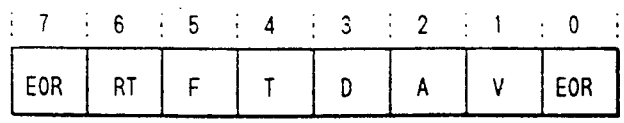

DATA PLAYBACK APPARATUS FOR REALIZING HIGH TRANSFER RATE

This application is a continuation of application Ser. No. 07/648,109 filed Jan. 31, 1991, now abandoned.

BACKGROUND OF THE INVENTION

The present invention relates to data playback apparatus for recording or playing back information from a recording medium such as a compact disk, a digital audio tape and an optical video disk (which will hereinafter be referred to as CD, DAT and LD, respectively) on which recorded are general digital data such as still picture, computer program and character data concurrently with time-dependent data such as speech and motion picture.

Recently, as represented by a compact disk read-only memory (which will hereinafter be referred to as a CD-ROM) there are are established ways to record general data such as character data and computer program on a recording medium, and the corresponding playback apparatus are being used widely. One example of the data playback apparatus will be described hereinbelow.

A CD is for recording a two-channel audio which is converted into digital data under the conditions that the sampling frequency is 44.1 kHz and the number of the quantization bits is 16, and the transfer rate of audio data in reproduction is 176.4 kbyte/sec. On the other hand, a CD-ROM is for recording general data such as character data, image data and computer program instead of the audio data. The CD-ROM substantially has the same structure as the CD except recording contents. In the CD-ROM the audio data storing region is block-structured so as to record such data, thereby obtaining 150 kbyte/sec of transfer rate, as exemplified by "Electronics" 1985 February P73–80.

There is a problem which arises with such an arrangement, however, in that a playback apparatus for the CD is directly applied for the CD-ROM to thereby obtain only 150 kbyte/sec of transfer rate. For instance, in the case of the transfer of image data, an image comprising 640×480 dots and having a data amount of 8 bits per pixel results in the data amount of 300 kbyte/sec per picture. That is, the read-out of the data corresponding to one picture requires 2 seconds.

A technique to improve the transfer rate is disclosed in U.S. Pat. No. 4,707,818 where the reduction of the transfer rate due to mixedly recording the audio data and the video data is minimized by increasing the reproduction linear velocity. That is, when mixedly recording both the audio data and video data on a CD, the transfer rate of the audio data is lowered so as to deteriorate the audio quality. In order to prevent the lowering of the transfer rate, the disk is rotated at a speed higher than the normal speed with respect to the region in which the audio data and video data are mixedly recorded. For the realization thereof, the reproduction linear velocity is recorded as control data in the disk and read out in reproduction of the data so as to perform the reproduction of the disk at a designated speed.

However, in the case of recording data in the CD-ROM in accordance with such a technique, difficulty is encountered to reproduce the data by means of a general CD-ROM drive unit. That is, because the real-time reproduction of the speech for this disk can be ensured only under the condition of increasing the linear velocity, it is difficult to perform the reproduction by means of a general CD-ROM drive unit which can realize only the transfer rate of 150 kbyte/sec.

In addition, since this unit is for directly processing and outputting the reproduced data on the basis of the real time and the reproduction velocity is determined in accordance with each of the data, difficulty is encountered to change the reproduction velocity in accordance with the destination of the data.

SUMMARY OF THE INVENTION

It is therefore an object of the present invention to provide a data playback apparatus which is capable of adequately realizing a high transfer rate in reproduction in accordance with each requirement.

One feature of the present invention is to determine, on the basis of the control information recorded in the recording medium, so that the reproduction of the recording medium is performed at a higher reproduction speed when the reproduction is not required to be made in real time, as compared with when reproduction is required to be made in real time. The determination of the real-time reproduction is made in accordance with whether the data to be read out from the recording medium are required to be processed and outputted on the basis of the real time. This arrangement allows reproduction of the data at an adequate transfer rate.

Another feature of the present invention is to perform the reproduction of the data from the recording medium at a higher reproduction speed in the case that the data reproduced from the recording medium are once stored and then processed and outputted in accordance with a requirement after the completion of the reproduction, as compared with the case that the data reproduced therefrom are successively converted into a speech signal, an image signal and others which are allowable to be outputted to an external circuit. This arrangement allows the reproduction at an optimal transfer rate to the state of a unit which processes the data reproduced from the recording medium, thereby permitting a more flexible data reproduction.

In accordance with the present invention, there is provided a data playback apparatus for reproduction of at least data and control information recorded in a recording medium, comprising: reproduction means for reproducing said data and control information from said recording medium so as to output a reproduction signal containing said data and control information; separation means coupled to said reproduction means so as to be responsive to said reproduction signal therefrom to separately output said control information and said data; processing and outputting means coupled to said separation means for processing and outputting said data outputted from said separation means; and control means coupled to said separation means to be responsive to said control information therefrom so as to determine, on the basis of said control information, whether the reproduction of said data recorded in said recording medium is required to be effected on the basis of the real time, said control means being coupled to said reproduction means so as to perform the reproduction of said data from said recording medium at a higher speed when the reproduction is not required to be effected on the basis of the real time as compared with the case of being required to be effected on the basis of the real time.

The recording medium has a disc-like configuration and has thereon coaxial or spiral tracks in which the control information and the data are recorded under the conditions of a constant angular velocity or constant linear velocity, and the reproduction means reproduces the data from the recording medium at the higher speed by increasing the reproduction angular velocity or reproduction linear velocity.

Preferably, the data playback apparatus comprises mode-changing switch means switchable from an external for performing a switching operation between a normal mode and a high-speed mode, and the control means controls the reproduction means to reproduce the data of the recording medium at the higher speed only in the case that the mode-changing switch means is directed to the high-speed mode and that the reproduction of data is not required to be effected on the basis of the real time.

In accordance with the present invention, there is further provided a data playback apparatus for reproduction of data recorded in a recording medium, comprising: reproduction means for reproducing said data from said recording medium and outputting the reproduced data; selection means coupled to said reproduction means for selectively distributing said data outputted from said reproduction means; processing means coupled to said selection means to be responsive to the data distributed by said selection means, said processing means once storing therein the distributed data so as to process the stored data and output the processed data after completion of the reproduction to be effected by said reproduction means; output means coupled to said selection means and said processing means to be allowed to be responsive to the data distributed by said selection means and the data outputted from said processing means so as to convert the data into a signal to be outputted to an external; and control means coupled to said processing means and said reproduction means so as to control said reproduction means to reproduce said data at a first reproduction speed and further to control said selection means to supply the data from said reproduction means to said output means when said processing means causes the data of said recording medium to be supplied to said output means, and control said reproduction means to produce the data from said recording medium at a second reproduction speed higher than said first reproduction speed and further to control said selection means to supply the data from said reproduction means to said processing means when said processing means causes the data of said recording medium to be supplied to said processing means.

BRIEF DESCRIPTION OF THE DRAWINGS

The present invention will be described in further detail with reference to the accompanying drawings, in which:

FIG. 4 is a block diagram showing a detailed arrangement of the FIG. 3 data playback apparatus;

FIGS. 5A to 5D are illustrations of a data format of a CD-ROM; and

FIGS. 6A to 6E are illustrations of a data format recording in the main channel of a CD-ROM.

DETAILED DESCRIPTION OF THE INVENTION

Figure 1:
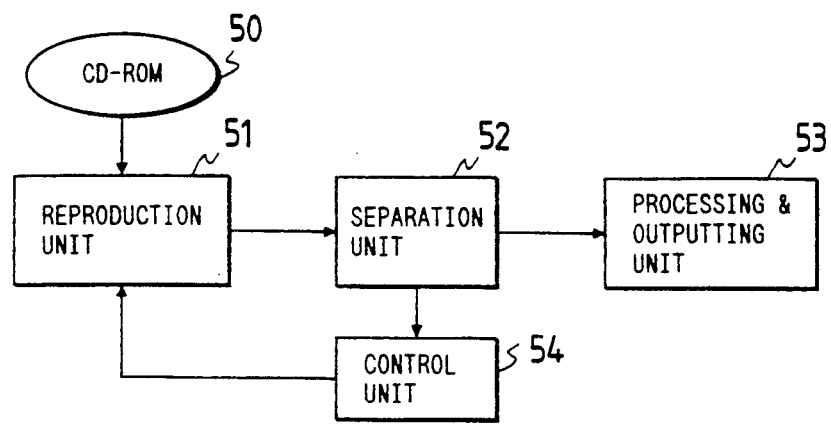
FIG. 1 is a block diagram showing a data playback apparatus according to an embodiment of the present invention.

A first embodiment of the present invention will be described hereinbelow with reference to FIGS. 1, 2 and 5A to 5D, FIG. 1 being a block diagram schematically showing an arrangement of a data playback apparatus according to the first embodiment of the present invention, FIG. 2 being a block diagram showing the detailed arrangement of the data playback apparatus, and FIGS. 5A to 5D illustrating a data format of a CD-ROM. The description will first be made in terms of the data format with reference to FIGS. 5A to 5D. Here, FIG. 5A is an illustration of a data frame which is the minimum unit in recording, FIG. 5B is an illustration of a sub-code frame, FIG. 5C is a Q-channel data format in a lead-in region, and FIG. 5D is an illustration of a Q-channel data format in a program area. In a CD there are three types of areas: the lead-in region, program area and lead-out area indicating the end of the disk, which are disposed from the inner circumference toward the outer circumference. Actually, data are recorded in the program area. In the CD data are recorded with a data format similar to the data format illustrated in FIGS. 5A to 5D.

In one data frame there are presented a sub-channel illustrated at numeral 2 and a main channel illustrated at numeral 1, which are time-division-recorded in the CD-ROM. In the sub-channel 2 there is provided a region for recording one byte of data and in the main channel 1 there are provided a region for 24 bytes of data, illustrated at numeral 3, and for 8 bytes of error detecting and correcting code illustrated at numeral 4, i.e., the total 32 bytes.

In the CD there are recorded two-channel audio data (which will hereinafter be referred to as CD-DA data) quantized under the conditions that the sampling frequency is 44.1 kHz and the number of the quantization bits is 16. Thus, the data frame rate becomes $44.1 k \times (16/8) \times 2/24 = 7350$ data frame/sec. In the CD-ROM general digital data block-structured are recorded in this region. The block-structuring technique will be described hereinafter. The error detecting and correcting code 4 is a code for error-detecting and error-correcting of the data in the main channel 1. The methods of producing the error detecting and correcting codes 4 for the CD and CD-ROM are the same.

Before recording these data in the CD-ROM, executed are works such as eight-to-fourteen-modulation (which will hereinafter be referred to as EFM) and addition of a data-frame synchronizing signal for distinguishing the boundary between the data frames. As a result, one data frame becomes 588 bits, and when recording the data in the CD-ROM, the bit rate becomes $588 \times 7350 = 4.3218$ Mbit/sec. The data are recorded at a constant speed (about 1.25 m/sec) in form of a NRZi signal.

The sub-code frame is constituted by the sub-channel 2 for successive 98 data frames. The number of the sub-code frames per one second is 75. FIG. 5B shows this state. The sub-channel 2 for the initial two data frames constitutes a sub-code frame synchronization 7 and the sub-channel 2 for the remaining 96 data frames is for recording data, i.e., so-called sub-code. In one byte of the sub-code, each bit corresponds to each of the channels, i.e., so-called P-channel, Q-channel, . . . , W-channel.

A P-channel 8 is a flag for search of the head portion of a track (which generally corresponds to one music), and at the beginning of each track in the program area is "1" for above 2 seconds. Further, in the lead-in region "1" and "0" are repeated at an interval of 2 seconds. In a Q-channel 9 there is recorded search information for search of data in the disk. In the Q-channel 9 of the program area addresses are recorded as the search information as illustrated in FIG. 5D. In the addresses there are presented the absolute time (AMIN, ASEC, AFRAME) increasing toward the outer circumference where the head portion of the program area is determined as a 0-minute/0-second/0-frame, the relative time (MIN, SEC, FRAME) where the head portion of each track is determined as a 0-minute/0-second/0-frame, the track numbers and the index. These addresses are recorded in form of the BDC code (binary coded decimal). Here, the frame means the unit of time and 75 frames correspond to one second. That is, the frame which is the unit of time is equal to the time length of one sub-code frame. The track numbers are fixed, i.e., 00 in the read-in region and AA (hexadecimal notation) in the read-out area. In the program area the track number can take 01 to 99.

A control to be recorded at the head portion of the Q-channel is 4 bits of control information. This takes various values in one track of the program area. In detail the following values are recorded.

0 0 x 0 ... 2 audio channels, with pre-emphasis
0 0 x 1 ... 2 audio channels, without pre-emphasis
0 1 x 0 ... data track
x x 0 x ... digital copy prohibited
x x 1 x ... digital copy permitted
where x represents "0" or "1".

In the CD there are recorded (0 0 x 0) and (0 0 x 1). On the other hand, in the CD-ROM there is recorded (0 1 x 0). Here, similarly, the CD-ROM disk allows formation of a track on which CD-DA data are recorded (which will hereinafter be referred to as a CD-DA track). In these tracks (0 0 x 0) and (0 0 x 1) are recorded as the control. That is, in the CD-ROM there are presented a disk having a track only on which general digital data block-structured are recorded in the region of the data 3 (which will hereinafter be referred to as a CD-ROM track) and a disk mixedly having a CD-ROM track and a CD-DA track.

In the Q-channel 9 of the lead-in region there is recorded information relating to the arrangement of the program area and the lead-out area which acts as search information. This information is known as TOC (table of contents), and there are recorded the absolute time of the head of each track in the program area, the control information of each track, the first and last track numbers in the program area, and the start absolute time in the lead-out region.

A recording method of the TOC will be described hereinbelow with reference to FIG. 5C. FIG. 5C illustrates the data structure of 96 bits in one sub-code frame of the Q-channel in the lead-in region. In the ADR disposed from bit 4 to bit 7 there is recorded (0 0 0 1). In FIG. 5C, MIN, SEC and FRAME show the relative time in the lead-in region with minute, second and frame, respectively. With 8 bits beginning from the bit 48, "0" is recorded. Further, with 16 bits beginning from the bit 80 is recorded a CRC (cyclic redundancy check) code for error detection. The TOC is recorded with the control, point, PMIN, PSEC and PFRAME.

In the case that the point is a BCD code and takes a value between 01 and 99, in the PMIN, PSEC and PFRAME the start absolute time of a track indicated by the point is recorded with minute, second and frame, and in the control there is recorded the control information of the track indicated by the point. For example, when the point, PMIN, PSEC, PFRAME and control are 09, 43, 20, 24 and 4 (0100), the ninth track shows the CD-ROM track which starts from 43-minute/20-second/24-frame at the absolute time. In the case that the point is A0 (hexadecimal notation), in the PMIN there is recorded "01" which means the track number of the first music track in the CD. In this case, "00" is recorded in the PSEC and PFRAME. In the case that the point is A1 (hexadecimal notation), in the PMIN there is recorded the track number of the last music track in the disk. In this case, "00" is recorded in the PSEC and PFRAME. In the case of the point is A2 (hexadecimal notation), in the PMIN, PSEC and PFRAME there is recorded the start address of the lead-out area at the absolute time. The TOC is repeatedly recorded in the lead-in region, and the same content is recorded in successive three sub-code frames. The treatment is integrally effected with respect to 6 channels from the R-channel to the W-channel. In CD graphic KARAOKE equipment which are on sale the graphic data are recorded in these channels.

Secondary, a description will be made hereinbelow in terms of the reproduction of the above-described CD-ROM performed by a data playback apparatus according to the present invention with reference to FIG. 1.

In FIG. 1, numeral 50 represents a CD-ROM, 51 designates a reproduction unit for reproduction of the CD-ROM and output of data and control information, 52 depicts a separation unit for separation between the data and the control information, 53 denotes a processing and outputting unit for processing and outputting the data, and 54 indicates a control unit for inputting the control information and controlling the reproduction unit 51. The CD-ROM mixedly has CD-ROM tracks (first and second tracks) in which the above-described character and image data are recorded and further has CD-DA tracks (third to tenth tracks) in which audio data are recorded.

In response to setting the CD-ROM 50 in the reproduction unit 51, the control unit 54 controls the reproduction unit 51 so as to reproduce the lead-in region of the CD-ROM 50. The reproduction unit 51 reproduces the lead-in region, and the separation unit 52 detects the data frame synchronization from the reproduced signal outputted from the reproduction unit 51 so as to perform the separation between the main channel 1 and the sub-channel 2. The data of the Q-channel 9 included in the sub-channel 2 is supplied to the control unit 54. The control unit 54 is arranged to store its internal memory the TOC which is recorded in the Q-channel 9. As mentioned above, in the TOC there are included the absolute time of the head portion of each track, the control information of each track and others, and therefore the control unit 54 can thereafter control the reproduction unit 51 so as to reproduce a given position of the CD-ROM 50 designated by an input unit (not shown).

In cases where the control unit 54 receives the instruction for reproduction of the fifth track from an external unit, the control unit 54 obtains the absolute time of the head portion of the fifth track and the control information of the fifth track from the TOC stored in the internal memory thereof. Further, the control unit 54 converts the absolute time into the physical position on the CD-ROM 50, and moves a pickup device (not shown) within the reproduction unit 51 up to the position and then indicates the reproduction to the reproduction unit 51. The control unit 54 decides, on the basis of the control information, that the fifth track corresponds to the CD-DA track. Since the CD-DA track requires the data to be reproduced on the basis of the real time, the reproduction is effected at a linear velocity of about 1.25 m/sec. In response to start of this reproduction, the CD-DA data are supplied to the processing and outputting unit 53 with the data rate of 176.4 kbyte/sec. The processing and outputting unit 53 converts the supplied CD-DA data into a two-channel analog audio signal which is in turn outputted to an external circuit.

Even in the case that the control unit 54 receives the instruction for reproduction of the second track from an external unit, the control unit 54 similarly obtains the absolute time of the head portion of the second track and the control information of the second track from the TOC stored in the internal memory thereof. Further, the control unit 54 converts the absolute time into the physical position on the CD-ROM 50, and moves a pickup device (not shown) within the reproduction unit 51 up to the position and then indicates the reproduction to the reproduction unit 51. The control unit 54 decides, on the basis of the control information, that the second track corresponds to the CD-ROM track. Since in the CD-ROM track there are generally recorded time-independent data such as character data and computer program, this reproduction is performed with the linear velocity being increased to above 1.25 m/sec. For instance, in the case of increasing the reproduction speed to two times, the processing and outputting unit 53 quickly receives data with the transfer rate of about 300 kbyte/sec.

Further, operation of the FIG. 1 data playback apparatus will hereinbelow be described in detail with reference to FIG. 2. FIG. 2 is a block diagram in detail showing the arrangement of the FIG. 1 data playback apparatus. Here, in the CD-ROM 50 the first and second tracks are the CD-ROM tracks and the third to tenth tracks are the CD-DA tracks. In FIG. 2, numeral 61 represents a spindle motor for rotating the CD-ROM 50, 62 designates a pickup device for reading out a signal from the CD-ROM 50, 63 depicts a waveform shaping circuit for shaping an analog signal to be outputted from the pickup device 62 into a pulse signal, 64 denotes a synchronization detector for detecting the data frame synchronization and the sub-code frame synchronization 7, 65 indicates an EFM demodulator, 66 represents an error detecting and correcting circuit for performing the error-detection and error-correction of the main channel 1 by using the error detecting and correcting code 4, 67 designates a RAM (random access memory), 68 is a microprocessor, 69 depicts a CD-ROM signal processing circuit, 70 denotes another RAM, 71 is a microprocessor, 72 represents a switching circuit, 73 designates a DA (digital-to-analog) converter, and 74 represents an interface circuit. Further, numeral 75 denotes a clock generating circuit which supplies a basic clock to a servo circuit 77 and the error detecting and correcting circuit 66, supplies a master clock to the microprocessors 68 and 71 and outputs a clock necessary for operations of the CD-ROM signal processing circuit 69, interface circuit 74 and DA converter 73.

Numeral 76 is a personal computer and 78 is a clock extracting circuit. The servo circuit 77 is for a CLV (constant linear velocity) servo to control the rotation of the spindle motor 61, a focus servo to focus the reading laser beam on the CD-ROM 50, a tracking servo to perform the follow-up of the reading leaser beam to a track spirally formed on the CD-ROM 50, and a traverse servo to move the pickup device 62 in a range between the inner and outer circumferences of the CD-ROM 50, for instance.

The reproduction unit 51 is composed of the spindle motor 61, the pickup device 62, the waveform shaping circuit 63, the synchronization detector 64, the clock extracting circuit 78 and the servo circuit 77. The separation unit 52 is composed of the EFM demodulator 65, the error detecting and correcting circuit 66, the RAM 67, the CD-ROM signal processing circuit 69, the RAM 70, the interface circuit 74, and the switching circuit 72. The processing and outputting unit 53 comprises the DA converter 73 and the personal computer 76. Further, the control unit 54 comprises the microprocessors 68, 71, the clock generating circuit 75 and the interface circuit 74.

First, when the CD-ROM 50 is set to the spindle motor 61, the microprocessor 68 controls the servo circuit 77 so as to reproduce the lead-in region of the CD-ROM 50. That is, the microprocessor 68 moves the pickup device 62 to the lead-in area by using the servo circuit 77, and then rotates the spindle motor 61 so as to effect the focusing servo and tracking servo of the pickup device 62. The signal to be read out by means of the pickup device 62 is an analog signal and hence converted into a pulse signal and then supplied to the synchronization circuit 64 and the clock extracting circuit 78. The clock extracting circuit 78 has therein a PLL circuit to thereby produce a clock (which will hereinafter be referred to as a reproduction clock), necessary for latching of data, on the basis of the inputted pulse signal. In the synchronization circuit 64 the inputted pulse signal is latched with the reproduction clock and supplied to the EFM demodulation circuit 65 and further to the error detecting and correcting circuit 66 after detection of the data frame synchronization and the sub-code frame synchronization.

In the EFM demodulation circuit 65, simultaneously with the EFM demodulation, the separation is performed between the main channel 1 and the sub-channel 2. The data of the main channel 1 are supplied to the next-stage error detecting and correcting circuit 66. Of the data of the sub-channel 2, the data of the Q-channel is error-detected through a CRC and the data with no error are supplied to the microprocessor 68. The microprocessor 68 stores, in its the internal memory (not shown), the TOC included in the inputted Q-channel data. On the basis of the control information within the TOC, the microprocessor 68 decides that in the CD-ROM 50 the first and second tracks are the CD-ROM tracks and the third to tenth tracks are the CD-DA tracks.

In cases where the personal computer 76 indicates the reproduction of the fifth track through the interface circuit 74 and the microprocessor 71 to the microprocessor 68, the microprocessor 68 obtains the absolute time of the head portion of the fifth track and the control information of the fifth track from the TOC stored in the internal memory thereof. Further, the microprocessor 68 converts the absolute time into the physical position on the CD-ROM 50, and moves the pickup device 62 to the position by means of the servo circuit 77 and indicates the reproduction. Until the start of the actual reproduction of the fifth track, the following procedure is executed.

That is, the microprocessor 68 first moves the pickup device 62 to the position approximately calculated on the basis of the absolute time to perform the reproduction. The EFM demodulation circuit 65 extracts the data of the Q-channel from the reproduced signal and then compares the absolute time included in the extracted data with the absolute time of the head portion of the fifth track within the TOC. If they are different from each other, the microprocessor 68 moves or track-jumps the pickup device 62 so as to shift the reproduction position. This operation is repeatedly performed until the reproduction position reaches the head portion of the fifth track. The reproduction starts when shifting up to the head portion of the fifth track. The microprocessor 68 decides, on the basis of the control information, that the fifth track is the CD-DA track. The CD-DA track requires the real time on reproduction and therefore this reproduction is effected with the linear velocity of about 1.25 m/sec. The microprocessor 68 controls the clock generator 75 so that the clock generator 75 generates a basic clock with 4.3218 MHz. This basic clock is supplied to the servo circuit 77 and further to the error detecting and correcting circuit 66.

The servo circuit 77 controls the rotation of the spindle motor 61 so that the reproduction clock supplied from the clock extracting circuit 78 becomes coincident in frequency with the basic clock. On the other hand, the error detecting and correcting circuit 66 performs the error detection and the error correction of the main channel 1 in accordance with the basic clock so as to output the CD-DA data with the data rate of 176.4 kbyte/sec. The data of the main channel 1 to be supplied to the error detecting and correcting circuit 66 is synchronous with the reproduction clock, and the reproduction clock contains jitters and therefore the jitter correction is made by using the RAM 67. The RAM 67 can also be used as a data buffer in the error detection and correction.

In the PLL circuit of the clock extracting circuit 78 there are included two voltage controlling oscillators whose central frequencies are 4.3218 MHz and 8.6436 MHz and which are arranged to be switchable. This switching operation is performed by means of the microprocessor 68. In the case that like the CD-DA track the real time characteristic is required for the data reproduction, a voltage controlling oscillator with a frequency of 4.3218 MHz is used.

The microprocessor 68 turns on the switching circuit 72 and the CD-DA data outputted from the error detecting and correcting circuit 66 passes through the switching circuit 72 and reaches the DA converter 73 to be converted into an analog audio signal and then outputted to an external circuit. The microprocessor 71 receives the status information from the microprocessor 68 to know the CD-DA reproduction, thereby stopping the operation of the CD-ROM signal processing circuit 69.

Similarly, in the case that the personal computer 76 indicates the reproduction of the second track through the interface circuit 74 and the microprocessor 71 to the microprocessor 68, the microprocessor 68 obtains the absolute time of the head portion of the second track and the control information of the second track from the TOC stored in the internal memory thereof. The microprocessor 68 converts the absolute time into the physical position on the CD-ROM 50 and performs the access to the second track as well as the access to the fifth track and then starts the reproduction. The microprocessor 68 decides, on the basis of the control information, that the second track is the CD-ROM track. The CD-ROM track has therein the data such as the character data and the computer program which are generally independent with time, and therefore this reproduction is effected with the linear velocity being increased from 1.25 m/sec up to about 2.5 m/sec. The detailed procedure is as follows.

The microprocessor 68 causes the clock generator 75 to generate the basic clock whose frequency is 8.6436 MHz and further performs the switching operation to the voltage controlling oscillator within the clock extracting circuit 78 which has a central frequency of 8.6436 MHz. The servo circuit 77 performs the rotation of the spindle motor 61 so that the reproduction clock supplied from the clock extracting circuit 78 is coincident in frequency with the basic clock. Thus, the CD-ROM 50 is rotated at a linear velocity which is two times of the linear velocity in the case of the CD-DA track. On the other hand, the error detecting and correcting circuit 66 performs the error detection and correction of the main channel 1 in accordance with the basic clock so as to output the data with the data rate of 352.8 kbyte/sec. The microprocessor 68 turns off the switching circuit 72 so as to prevent the data from being outputted as sound through the DA converter 73. The microprocessor 71 receives the status information from the microprocessor 68 to decide that the output of the error detecting and correcting circuit 66 is the CD-ROM data block-structured, thereby operating the CD-ROM signal processing circuit 69. The CD-ROM signal processing circuit 69 performs the error detection and correction of the CD-ROM and others, and the data are supplied through the interface circuit 74 to the personal computer 76 with the transfer rate of 300 kbyte/sec. The personal computer 76 receives the data so as to output images or characters.

A second embodiment of the present invention will be described hereinbelow with reference to FIGS. 2 and 6A to 6E. Unlike the above-described first embodiment which does not require the real-time reproduction of data, the second embodiment of this invention is for the case of requiring the real-time reproduction of data from a CD-ROM. FIGS. 6A to 6E are illustrations for describing data formats to be recorded in the main channel 1 of the CD-ROM. FIG. 6A is an illustration of a data format of a sector of a CD-ROM mode 1, FIG. 6B is an illustration of a data format of a sector of CD-ROM mode 2 and form 1, FIG. 6C is an illustration of a data format of a sector of CD-ROM mode 2 and form 2, FIG. 6D is an illustration of the recording contents of a sub-header, and FIG. 6E is an illustration of a sub-mode byte.

As illustrated in FIG. 5A, 24 bytes of data are recorded in the main channel 1 of one data frame. In the CD-ROM track 2352 bytes of data corresponding to 98 data frames are structured as one sector. The length of one sector corresponds to the length of one sub-code frame. Each sector has at its head portion a 12-byte synchronizing signal for distinguishing a separation between the sectors, and following the synchronizing signal, there is a 4-byte header. In the initial three bytes of the header, i.e., so-called physical sector address, there is recorded an absolute address where the head portion of the program area is 0-minute/0-second/0-sector. This absolute address has a value equal to the absolute time (AMIN, ASEC, AFRAME) described with reference to FIG. 5C. The final byte of the header indicates a mode whose value affects the recording contents of the remaining 2336 bytes. A mode 0 represents that all of the remaining 2336 bytes are 0. As illustrated in FIG. 6A, in the mode 1, there are added a 4-byte error detecting code, an 8-byte 0-data and a 276-byte error correcting code after 2048-byte user data. In the mode 2 there is further added an 8-byte sub-header after the header. As shown in FIG. 6D, in the sub-header there are two times recorded 4 bytes of a file number, a channel number, a sub-mode, and coding information in order. As shown in FIG. 6E, the sub-mode is bit-encoded.

Further, the fifth bit for the sub-mode is so-called form bits whose values affect the 2328-byte format following the sub-header. The sector whose form bit is 0 is so-called form 1 sector whose data structure is made by adding a 2048-byte user data, a 4-byte error detecting code and a 276-byte error correcting code after the sub-header as shown in FIG. 6B. On the other hand, the sector whose form bit is 1 is so-called form 2 sector whose data structure is made by adding a 2324-byte user data and a 4-byte reserve region after the sub-header as shown in FIG. 6C.

Moreover, the sixth bit for the sub-mode is so-called real-time sector bit which is control information for determining whether the reproduction of data on the CD-ROM track is required to be made on the basis of the real time. The sector that the bit is 1 is so-called real-time sector, and the file including this sector is a time-dependent file and is required to be reproduced on the basis of the real time. For example, in the case of simultaneously reproducing both the speech and image for a long time, it is required to read the image data simultaneously with reading the speech data from the recording medium. Generally, for the realization, the sector in which compressed speech data is recorded and the sector in which image data are recorded are recorded under the time-sharing-multiplexing. In reproduction, when the processing and outputting unit 53 receives the sector having therein the compressed speech data from the separation unit 52, the compressed speech data are stored in a buffer of the processing and outputting unit 53 and, at the same time, decoded and outputted as a speech. Further, when the image data receives the recorded sector, with the compressed speech data stored in the buffer being decoded, the image data are written in the image memory. In such an application, the data reproduction for the CD-ROM track is also required to be made on the basis of the real time.

A description will be made hereinbelow in terms of reproduction made by the FIG. 2 data playback apparatus. As well as in the first embodiment, in the CD-ROM 50 the first and second tracks are the CD-ROM tracks and the third to tenth tracks are the CD-DA tracks. Further, in the CD-ROM track there are recorded data which require the real-time reproduction and data which do not require the real-time reproduction. The reading operation of the TOC and the reproduction of the CD-DA track of this embodiment are similar to those in the first embodiment and hence the description thereof will be omitted for brevity.

Although in the first embodiment the track number is designated so as to perform the reproduction of the CD-ROM 50, the description of this embodiment will be made in terms of the case that the logical sector address is designated from the personal computer 76. The sector that the physical sector address is 0-minute/2-second/0-sector corresponds to 0 of the logical sector addresses.

For example, in cases where the personal computer 76 generates a command through the interface circuit 74 to the microprocessor 71 so that the data of the 4500 sectors are reproduced from the logical sector address 12000, the microprocessor 71 converts the logical sector address (12000) into the physical address (2-minute/42-second/0-sector). This physical address is supplied to the microprocessor 68. The microprocessor 68 decides, on the basis of the TOC read out from the disk, that the reproduction position is the CD-ROM track and communicates it to the microprocessor 71 as the status information. Thus, the microprocessor 71 sets the physical address in an address register (not shown) within the CD-ROM signal processing circuit 69.

Because the reproduction position is the CD-ROM track, the microprocessor 68 performs the reproduction with 2.5 m/sec as well as in the first embodiment. As a result, the error detecting and correcting circuit 66 performs the error detection and correction of the main channel 1 and supplies the CD-ROM signal processing circuit 69 with the data at the data rate of 352.8 kbyte/sec. The CD-ROM signal processing circuit 69 first detects the 12-byte synchronizing signal and detects the coincidence between the physical sector address recorded in the header after the synchronizing signal and the contents of the address register. In response to the confirmation of the coincidence therebetween, the mode byte is checked, and if it is the mode 1, the error detection and correction of the CD-ROM is performed and the total 4500 sector data are supplied through the interface circuit 74 to the personal computer 76 at the transfer rate of 300 kbyte/sec. On the other hand, if it is the mode 2, the sub-header is supplied to the microprocessor 71 so that the real-time sector bit of the sub-mode byte is checked. If this bit is 0, the reproduction is continued at the same speed as it is. If the bit is 1, since the reproduction is required to be performed at the normal speed, the microprocessor 71 once stops the operation of the CD-ROM signal processing circuit 69 and sends a command to the microprocessor 68 so that the reproduction is restarted at the normal reproduction speed. The microprocessor 68 once interrupts the reproduction in accordance with the command and then controls the clock generator 75, the servo circuit 77 and the clock extracting circuit 78 so that the reproduction is restarted at the linear velocity of 1.25 m/sec.

As described according to this embodiment, the data playback apparatus is equipped with the reproduction unit for reproducing a recording medium on which data and control information are recorded and outputting the reproduced signal, the separation unit for separating the reproduced signal into the control information and the data, the processing and outputting unit for processing and outputting the data, and the control unit for determining on the basis of the control information whether the real time is required for the data reproduction and, if the real time is not required, for controlling the reproduction unit so as to reproduce the recording medium at a higher speed as compared with the case that the real time is required. This arrangement allows reproducing the data at a high transfer rate when the real time is not required for the data reproduction.

Here, although the description of this embodiment is made such that two types of voltage controlling oscillators are provided in the PLL circuit of the clock extracting circuit 78 to be switched, it is appropriate to realize the clock extracting circuit with a PLL circuit having a wide pull-in range. In this case, a high-speed reproduction can be realized at a given reproduction speed. The realization of the given reproduction speed permits that the reproduction speed can be set in accordance with the processing ability of the processing and outputting unit 53 and the reproduction speed can be controlled in accordance with the requirement from the processing and outputting unit. Moreover, although in the second embodiment the microprocessor 68 or 71 reads the control information so as to judge the reproduction speed, it is also possible that the control information is supplied to the personal computer 76 so that the personal computer 76 designates the reproduction speed. In this case, the personal computer 76 not only acts as the processing and outputting unit 53 but also functions as a portion of the control unit 54.

In addition, although in the second embodiment the control information is recorded in a region such as the sub-channel and sub-header other than the user data region, the recorded position of the control information is not limited to this region, but it is also possible to record it in the user data region. For instance, it is appropriate that the control information is recorded in the user data region as a portion of the directory information indicating the arrangement of data in the recording medium. In this case, prior to the data reproduction, the directory information is read by the personal computer and the designation of the reproduction speed is made by the personal computer. Further, it is also possible to incorporate the control information into a portion of an application program executed by the personal computer. In this case, the personal computer executes the application program and designates the reproduction speed. Various ways can be considered in order to incorporate the control information into the application program or directory information. In the case of being incorporated as the directory information, a flag is provided as an attribute of each file so as to indicate either the non-real-time file or real-time file. In addition, in the case of being incorporated into the application program, there are a way that the application program designates the reproduction speed by using a function call and a way that two function calls, i.e., a function call in the case of requiring the real time in reproduction and a function call in the case of not requiring the real time, are provided so that the application program selects one of them to reproduce the data, for instance. In these cases, the personal computer 76 not only acts as the processing and outputting unit 53 but also functions as a portion of the separation unit 52 and the control unit 54.

Still further, although in this embodiment the microprocessor 68 determines the reproduction speed on the basis of the control information of the TOC, it is also appropriate to use the control of the Q-channel which is the control information recorded in the program area. In this case, the reproduction may first be performed at the normal speed and then the reproduction speed is gradually increased after the determination is made such that the real time is not required. In addition, it is also appropriate that a switch operable from an external is provided in the data playback apparatus to perform the switching operation between the normal mode and the high-speed mode, and only in the case that the switch takes the high-speed mode and that the real time is required for the data reproduction, the control unit is arranged to reproduce the recording medium at the high speed. In this case, the state of the switch may be detected by the microprocessor 68 or 71.

Figure 3:
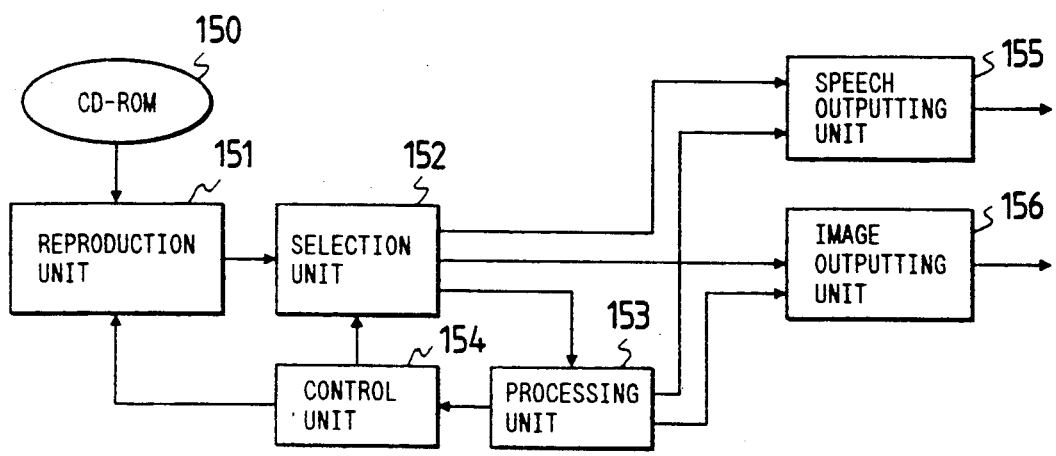
FIG. 3 is a block diagram showing a data playback apparatus according to a further embodiment of this invention.

A description will be made hereinbelow in terms of a third embodiment with reference to FIGS. 3, 4, 5A to 5D and 6A to 6E. The third embodiment is for a case that the data reproduced from a recording medium is once stored and processed and outputted in accordance with a requirement after the completion of the reproduction. In this case, the reproduction can be effected at a higher speed as compared with the case that the data reproduced from a recording medium are successively converted so as to be outputted to an external circuit. Similarly, in this embodiment a CD-ROM is used as the recording medium. FIG. 3 is a block diagram schematically showing an arrangement of a data playback apparatus of the third embodiment of this invention, and FIG. 4 is a block diagram showing the detailed arrangement of the FIG. 3 data playback apparatus.

Prior to describing the third embodiment, a description is further made in terms of the sub-mode byte with reference to FIG. 6E. The bits 1, 2 and 3 of the sub-mode are so-called video bit, audio bit and data bit, respectively. The sector that the video bit is 1 is so-called video sector and the image data are recorded as the user data. The sector that the audio bit is 1 is so-called audio sector and the compressed speed data are recorded as the user data. Further, the sector that the data bit is 1 is so-called data sector and the computer program, character data and others are recorded as the user data. These sectors can be mixed in one file.

For example, in the case of realizing a file for reproducing speech simultaneously with image for a long time, with the speech data being read out from the recording medium, the image data are required to be read out therefrom. Therefore, the audio sector and the video sector are recorded so as to keep a predetermined separation and the data are distributed (sent) to the image output unit and/or the speech output unit in reproduction. In detail, when the speech output unit receives the audio sector, the compressed speech data are stored in a buffer of the speech output unit and at the same time the compressed speech data are decoded and outputted as speech. Further, when an image memory of the image output unit receives the video sector, the speech output unit decodes the compressed CD-DA data stored in the buffer thereof to as to prevent interrupt of the speech. The file in which the sectors are different in recorded contents from each other is so-called interleave file.

A description will be made with reference to FIG. 3 in terms of the reproduction effected by the data playback apparatus of this invention. In FIG. 3, numeral 150 represents a CD-ROM, 151 designates a reproduction unit for reproducing the CD-ROM 150 and outputting the reproduced data, 152 depicts a selection unit for distributing the output data of the reproduction unit in accordance with a control unit 154. Further, 153 denotes a processing unit for once storing therein the data supplied from the selection unit 152 and for processing the data in accordance with the requirement at the time of completion of the reproducing operation of the CD-ROM 150. The control unit 154 is for controlling the reproduction unit 151 and the selection unit 152 in accordance with instructions from the processing unit 153. Still further, 155 a speech output unit for receiving the compressed speech data or CD-DA data and for converting it into an analog speech signal to be outputted. The CD-ROM 150 mixedly has CD-ROM tracks (the first and second tracks) in which the above-mentioned character or image data are recorded and CD-DA tracks (the third to tenth tracks) in which CD-DA data are recorded, and the CD-ROM track is recorded in the mode 2.

First, in response to the CD-ROM 15 being set to the reproduction unit 151, the reproduction unit 151 reproduce the lead-in region of the CD-ROM 150 and stores its internal memory the TOC recorded in the Q-channel 9. As described above, in the TOC there is included the absolute time of the head portion of each track, and thereafter the reproduction unit 151 can reproduce a given position of the CD-ROM 150.

A description will be made in terms of the case (CD-DA reproduction) that the CD-DA track (for example, the fifth track) is reproduced and the outputted data are outputted as an analog speech signal to an external circuit. The processing unit 153 supplies instructions to the control unit 154 so that the fifth track is reproduced and the reproduced data are supplied to the speech output unit 155. Because the received instruction is the CD-DA reproduction instruction, the control unit 154 performs instruction to the reproduction unit 151 so that the reproduction of the fifth track is effected at the normal speed (1.25 m/sec) and performs instruction to the selection unit 152 so that the inputted data are supplied to the speech output unit 155. The reproduction unit 151 obtains the absolute time of the head portion of the fifth track from the TOC stored in the internal memory thereof and converts the absolute time into the physical position on the CD-ROM 150 to move a pickup device (not shown) up to the position and then start the reproduction. In response to the start of the reproduction, the CD-DA data are supplied through the selection unit 152 to the speech output unit 155 at the data rate of 176.4 kbyte/sec. The speech output unit 155 converts the supplied CD-DA data into a two-channel analog speech signal to be outputted to an external circuit.

Secondly, a description will be made hereinbelow in terms of the case (CD-ROM reproduction) that the interleave file in which the audio sector and the video sector are time-sharing-multiplexed is reproduced so as to output a speech signal and an image signal. The processing unit 153 performs instruction to the control unit 154 (reproduction instruction of the CD-ROM) so that the interleave file is reproduced and the reproduced data are supplied to the speech output unit 155 or the image output unit 156. In detail, the processing unit 153 informs the logical sector address of the head portion of the interleave file to the control unit 154. The control unit 154 converts the logical sector address into the physical sector address and gives instruction to the reproduction unit 151 so as to perform the reproduction from this address at the normal speed (1.25 m/sec). The reproduction unit 151 starts the reproduction from the designated position by using the absolute time of the sub-code Q-channel 9. In the selection unit 152 the signal processing of the CD-ROM is performed. Since the data of the CD-ROM track inputted to the selection unit 152 are block-structured as illustrated in FIGS. 6A to 6E, after the synchronization detection and the address detection are executed inside the selection unit 152, the data of the sub-header are supplied to the control unit 154. The control unit 154 checks the sub-mode of the sub-header, and controls the section unit 152 so that the user data are supplied to the image output unit 156 if it is the video sector. On the other hand, if it is the audio sector, the instruction is made such that the user data are supplied to the speech output unit 155.

Secondly, a description will be made hereinbelow in terms of the case (reading of the CD-ROM) that a given file of the CD-ROM is read out to the processing unit 153. The processing unit 153 designates the logical sector address to the control unit 154 which in turn supplies the data to the processing unit 153 (reading instruction of the CD-ROM). In this case, all the read data are once stored in the processing unit 153 and then outputted through the speech output unit 155 or the image output unit 156. Thus, since in this case the reproduction speed of 1.25 m/sec is not required, the control unit 154 designates the reproduction position to the reproduction unit 151 and supplies instruction thereto so as to increase the reproduction speed up to two times (2.5 m/sec). In response to the reproduction unit 151 starting the reproduction from the designated position at the two-time speed, the selection unit 152 as described above performs the signal processing of the CD-ROM and the data of the sub-header are supplied to the control unit 154. In this case, since irrespective of the value of the sub-mode the sector belonging to the designated file is supplied to the processing unit 153, the control unit 154 controls the selection unit 152 so that the data are supplied to the processing unit 153.

Figure 2:
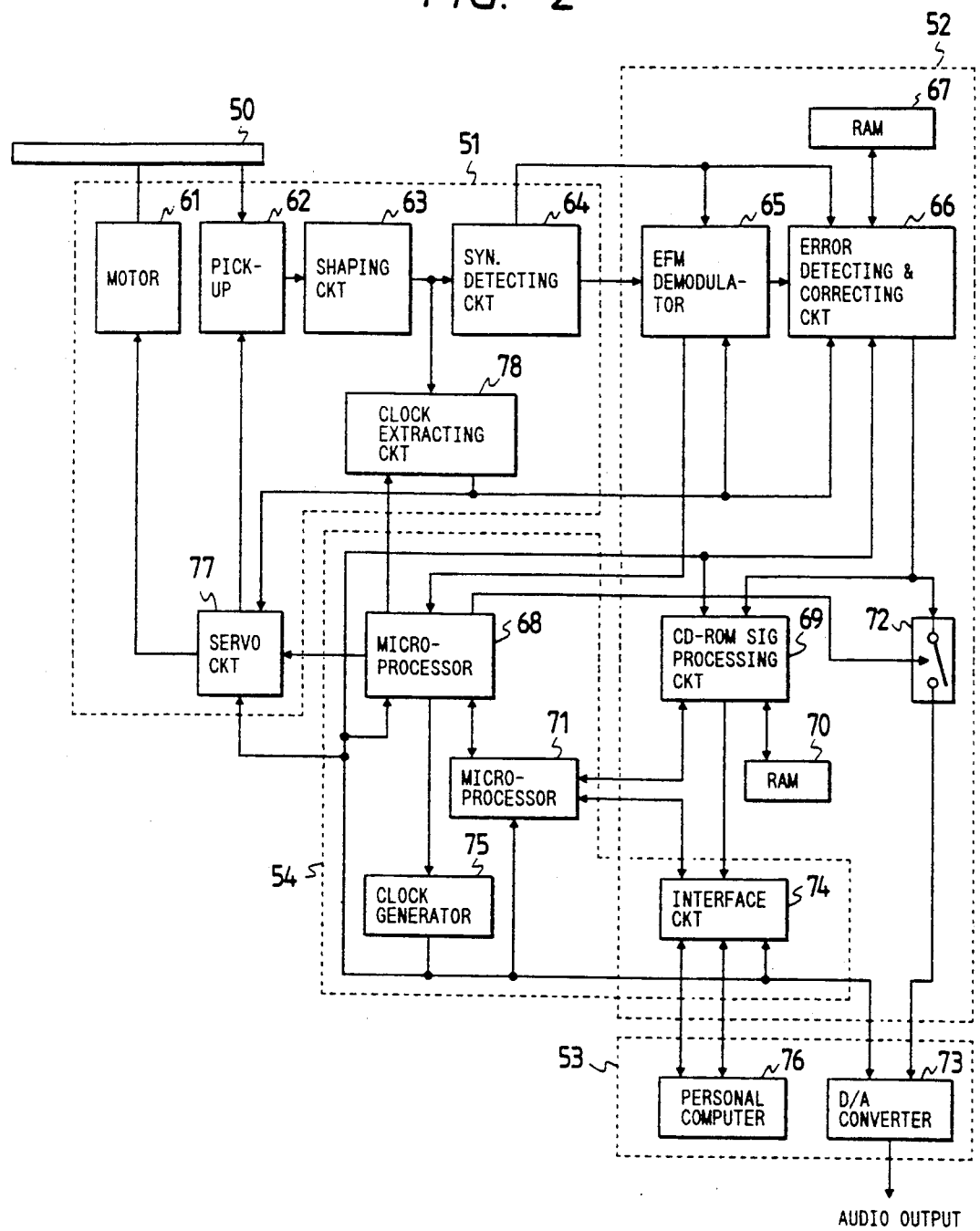
FIG. 2 is a block diagram showing a detailed arrangement of the FIG. 1 data playback apparatus.

Further, a description will hereinbelow be made in detail in terms of the operation of the FIG. 3 data playback apparatus with reference to FIG. 4 showing a more detailed arrangement of the FIG. 3 data playback apparatus, where parts corresponding to those in FIG. 2 are marked with the same numerals and the description thereof will be omitted for brevity. In FIG. 4, numerals 168, 171 and 176 respectively represent microprocessors and 169 designates a CD-ROM signal processing circuit. Numeral 172 is a switching circuit for distributing the data supplied from the error detecting and correcting circuit 66 to a DA converter 173 or the CD-ROM signal processing circuit 169 in accordance with instructions of the microprocessor 171. Numeral 175 represents a clock generator for supplying a basic clock to the servo circuit 77 and the error detecting and correcting circuit 66, 176 depicts a microprocessor, 79 denotes an input unit such as a and keyboard, 80, 83 and 84 are respectively interface circuits, 81 designates a ROM, 82 is a DMA controller, 85 depicts a RAM, 86 represents a speech decoder for decoding the compressed speech data, and 87 is a system bus. Further, 88 is a switching circuit for distributing the user data supplied from the CD-ROM signal processing circuit 169 to the speech decoder or the interface circuit 83. Numeral 89 is an image decoder and 90 represents an image memory. Numerals 151 to 156, surrounded by dotted lines, respectively represent the reproduction unit 151, selection unit 152, processing unit 153, control unit 154, speech output unit 155 and image output unit 156 illustrated in FIG. 3. The microprocessor 176 realizes both the function of a portion of the selection unit 152 and the function of a portion of the processing unit 153. Further, the DMA controller 82 is shown in the illustration to be a portion of the selection unit 152. Here, if the DMA transfer is used when the processing unit 153 outputs the data of the RAM 85 to the speech output unit 155 or the image output unit 156, the DMA controller 82 further realizes the function of the processing unit 153.

First, in response to the CD-ROM 150 being set to the spindle motor 61, the microprocessor 168 controls the servo circuit 77 so that the read-in region is reproduced. The signal read out by the pickup device 62 is converted by means of the waveform shaping circuit 63 into a pulse signal and then supplied to the synchronization detecting circuit 64 and the clock extracting circuit 78. The clock extracting circuit 78 has therein a PLL circuit whereby the reproduction clock is extracted from the inputted pulse signal and outputted. The synchronization detecting circuit 64 latches the pulse signal with the reproduction clock and detects the data frame synchronization and the sub-code frame synchronization, the detection signals being supplied to the EFM demodulation circuit 65 and the error detecting and correcting circuit 66. The EFM demodulation circuit 65 performs the separation between the main channel 1 and the sub-channel 2 concurrently with performing the EFM demodulation. The data of the main channel 1 are supplied to the next-stage error detecting and correcting circuit 66. Of the data of the sub-channel 2, the data of the Q-channel 9 are error-detected by means of a CRC and the data with no error are supplied to the microprocessor 168. The microprocessor 168 stores in its internal memory (not shown) the TOC included the inputted Q-channel9 data. On the basis of the TOC, the microprocessor 168 knows the start absolute time of each track of the CD-ROM 150.

The microprocessor 176 is coupled through the system bus 87 to the interface circuit 80, ROM 81, DMA controller 82, interface circuit 83, interface circuit 84, RAM 85, speech decoder 86 and image decoder 89. The system bus 87 comprises a data bus, an address bus and a control line. In the ROM 81 there is recorded a basic program for execution of the microprocessor 176. In response to the CD-ROM 150 being set to the spindle motor 61, the application program to be executed by the microprocessor 176 in accordance with a way, which will be described hereinafter, is read out from the CD-ROM 150 to the RAM 85. The microprocessor 176 executes this application program and reads out various data from the CD-ROM 150. The basic program is a program for controlling various hardwares coupled to the system bus 87 and the interface circuits. The application program controls these hardwares by using the basic program. The input unit 79 is used when the user selects the application program to be executed by the microprocessor 176 or selects the data to be read out from the CD-ROM 150.

A description will first be made hereinbelow in terms of the CD-DA reproduction, i.e., the case that the instruction for the reproduction of the CD-DA track (for example, the fifth track) is made by the user of the data playback apparatus or the application program. The microprocessor 176 instructs the microprocessor 171 to reproduce the CD-DA track, i.e., the fifth track, and further to output a speech signal. Because the instruction supplied is the CD-DA reproduction instruction, the microprocessor 171 causes the switching circuit 172 to take the DA converter 173 side. Further, microprocessor 171 instructs the microprocessor 168 to reproduce the fifth track at the normal speed. The microprocessor 168 obtains the absolute time of the head portion of the fifth track from the TOC stored in the internal memory thereof. The microprocessor 168 converts the absolute time into the physical position on the CD-ROM 150 and instructs the reproduction after moving the pickup device 62 up to the position through the servo circuit 77. The procedure taken until the actual start of the reproduction of the fifth track is the same as in the first embodiment and therefore the description thereof will be omitted for brevity.

The reproduction of the fifth track is performed at the linear velocity of about 1.25 m/sec as instructed by the microprocessor 171. The microprocessor 168 instructs the clock generator 175 to generate the basic clock whose frequency is 4.3218 MHz. This basic clock is supplied to the servo circuit 77 and further to the error detecting and correcting circuit 66. The servo circuit 77 controls the rotation of the spindle motor 61 so that the reproduction clock supplied from the clock extracting circuit 78 becomes coincident in frequency with the basic clock. On the other hand, the error detecting and correcting circuit 66 performs the error detection and correction of the main channel 1 in accordance with the basic clock and outputs the CD-DA data at the data rate of 176.4 kbyte/sec. The PLL circuit of the clock extracting circuit 78 has therein two voltage controlling oscillators whose central frequencies are 4.3218 MHz and 8.6436 MHz, respectively, which are arranged to be switched in use. This switching operation is effected by means of the microprocessor 168. In cases where the microprocessor 171 gives the instruction so as to perform the reproduction at the normal speed, the voltage controlling oscillator of 4.3218 MHz is used. The CD-DA data outputted from the error detecting and correcting circuit 66 are supplied through the switching circuit 172 to the DA converter 173 to be converted into an analog speech signal and then outputted to an external circuit.

Further, a description will be made hereinbelow in terms of the CD-ROM reproduction, i.e., the case that the interleave file in which the audio sector and the video sector are time-sharing-multiplexed is reproduced so as to output a speech signal and an image signal through the speech output unit 155 and the image output unit 156 to an external unit. As described above, this CD-ROM reproduction instruction is also made through the user of the data playback apparatus or the application program. Let it be assumed that the interleave file starts from the logical sector address 12000. The microprocessor 176 designates the logical sector address (12000) of the head portion of the interleave file to the microprocessor 171, and instructs that the reproduced data are outputted through the speech output unit 155 or the image output unit 156 to an external circuit. The microprocessor 171 knows that the reception instruction is the the reproduction instruction of the CD-ROM track and converts the logical sector address into the physical sector address (2-minute/42-second/0-sector) and further instructs the microprocessor 168 to perform the reproduction from this address. At this time, since the reproduced data are processed at the real time and outputted to an external circuit, the reproduction speed is designated to be 1.25 m/sec. In addition, the microprocessor 171 operates the switching circuit 172 to the CD-ROM signal processing circuit 169 side. Moreover, the microprocessor 171 sets the physical sector address into an address register (not shown) of the CD-ROM signal processing circuit 169. The microprocessor 168 starts the reproduction from the designated position by using the absolute time of the sub-code Q-channel 9. The CD-ROM signal processing is performed for the data supplied through the switching circuit 172 to the CD-ROM signal processing circuit 169.

In the CD-ROM signal processing circuit 169 the synchronization detection of the inputted data train is first performed and the position of the header is designated. The physical sector address of this header is compared with the value of the address register. The sub-headers of the sectors after the coincidence therebetween are supplied to the microprocessor 171. The microprocessor 171 checks the sub-mode of the sub-header. If it is the audio sector, the switching circuit 88 is directed to the speech decoder 86 side so that the user data (compressed speech data) are supplied to the speed decoder 86. The speech decoder 86 receives the compressed speech data to be supplied successively and, at the same time, decodes the received compressed speech data and and supplies them to the DA converter 173.

In the case that the sector synchronization-detected by the CD-ROM signal processing circuit 169 is the video sector, the user data (image data) of this sector are supplied through the switching circuit 88, interface circuit 83, system bus 87 and image decoder to the image memory 90. The microprocessor 171 first operates the switching circuit 88 to the interface circuit 83 side and communicates through the interface 84 to the microprocessor 176 in terms of supply of the video sector. The microprocessor 176 sets the DMA controller 82 so that the source is set to the interface circuit 83 and the destination is set to the image memory 90, then starting the DMA transfer. The DMA controller 82 becomes the bus master of the system bus 87 so as to supply the image memory 90 with the data to be delivered from the interface circuit 83. When the image data successively delivered reaches the amount corresponding to one picture, the microprocessor 176 supplies the indication instruction of the image data to the image decoder 89. The image decoder 89 reads out, in accordance with the image synchronization signal, the image data stored in the image memory 90 and converts them into an image signal to be outputted to an external circuit.

As described above, in the case that the reproduced data are decoded at the real time and outputted to an external circuit with the CD-ROM 150 being reproduced (the reproduction of the CD-DA or CD-ROM), the reproduction of the CD-ROM 150 is effected at the normal speed. Secondly, a description will be made hereinbelow in terms of the case (the reading of the CD-ROM) that the data outputted from the CD-ROM 150 are once stored in the RAM 85 and then processed in accordance with a requirement at the time of the completion of the reproduction and outputted.

First, the microprocessor 176 communicates the number of the sectors and the logical sector address of the head portion of the file to be read through the interface circuit 84 to the microprocessor 171. At this time, it communicates thereto the fact that the read data are stored in the RAM 85. Because the received instruction is the reading instruction of the CD-ROM 150, the microprocessor 171 instructs the microprocessor 168 to increase the reproduction speed of the CD-ROM to two times (2.5 m/sec). Further, the microprocessor 171 operates the switching circuit 172 to be directed to the CD-ROM signal processing circuit 169 side and further operates the switching circuit 88 to be directed to the interface circuit 83 side.

The microprocessor 168 instructs the clock generator 175 to generate the basic clock of 6436 MHz, and switches the voltage controlling oscillator of the clock extracting circuit 78 to perform the oscillation with the central frequency of 8.6436 MHz. The servo circuit 77 controls the rotation of the spindle motor 61 so that the reproduction clock supplied from the clock extracting circuit 78 becomes coincident in frequency with the basic clock. Thus, the CD-ROM 150 is rotated at the linear velocity increased up to two times. On the other hand, the error detecting and correcting circuit 66 performs the error detection and correction of the main channel 1 in accordance with the basic clock so as to output the data at the data rate of 352.8 kbyte/sec.

Since the switching circuit 172 is directed to the CD-ROM signal processing circuit 169 side, the data outputted from the error detecting and correcting circuit 66 are supplied to the CD-ROM signal processing circuit 169. The CD-ROM signal processing circuit 169 performs the above-described process at the speed increased up to two times, and the data of the sub-header are sent to the microprocessor 171. In this case, since irrespective of the value of the sub-mode the sector belonging to the designated file is sent to the RAM 85, the microprocessor 171 sets the switching circuit 88 to the interface circuit 83 side. In response to the completion of the transfer preparation for the user data corresponding to one sector, the microprocessor 171 gives the information representing the completion of the data transfer preparation through the interface circuit 84 to the microprocessor 176. The microprocessor 176 sets the DMA controller 82 so that the transfer is made for the interface circuit 83 and the RAM 85. The DMA controller 82 becomes the bus master of the system bus 87 so that the data supplied through the interface circuit 83 are sent to the RAM 85. When the above-described process is repeated by the number of times designated by the microprocessor 176, the microprocessor 171 instructs the microprocessor 168 to terminate the reproduction of the CD-ROM 150. In response to the completion of the reading of the desired data, the microprocessor 176 processes the data in the RAM 85 in accordance with a requirement. For example, if the read data relates to an application program, the application program is executed. On the other hand, if the read data are the compressed speech data, the compressed speech data are supplied through the system bus 87 to the speech decoder 86 so as to be outputted as a speech in accordance with a requirement. Further, the image data stored in the RAM 85 can be supplied to the image memory 90 to be indicated in accordance with the instruction from the input unit 79. Thus, the reproduction is effected at a high speed in the case that all the data reproduced by the reproduction unit 151 are once stored in the buffer and processed after the completion of the reproduction.

According to this embodiment, the data playback apparatus comprises a reproduction unit for reproducing a recording medium to output the reproduced data; one or more output unit for successively converting the data into a speech signal, an image signal and others which can be outputted to an external circuit; a processing unit for once storing therein the data and for processing the data in accordance with a requirement after the completion of the reproduction to output them to the output unit; a selection unit for distributing the data outputted from the reproduction unit into the processing unit or the output unit; and a control unit for instructing the reproduction unit to perform the reproduction at a first reproduction speed when the processing unit gives instruction to supply the data of the recording medium to the output unit and controlling the selection unit so as to supply the reproduced data to the output unit, and for instructing the reproduction unit to perform the reproduction at a reproduction speed higher than the first reproduction speed when the processing unit gives instruction to supply the data of the recording medium to the processing unit and controlling the selection unit to supply the outputted data to the processing unit. This arrangement allows high-speed reproduction and data reading with high transfer rate in the case that all the data reproduced by the reproduction unit are once stored in the buffer and then processed after the completion of the reproduction.

Here, although in the third embodiment two types of voltage controlling oscillators within the PLL circuit of the clock extracting circuit 78 are provided to be switchable from each other, it is appropriate to realize the clock extracting circuit comprising a PLL circuit having a wide pull-in range. In this case, a high-speed reproduction can be effected at a desired reproduction speed. If realizing the desired reproduction speed, it is possible to control the reproduction speed in accordance with the requirement from the processing unit. Further, although in the third embodiment the application program is recorded in the CD-ROM, the recording position of the application program is hot limited to the CD-ROM. For example, it is preferable that the application program is recorded in a floppy disk with a floppy disl drive unit being incorporated into the data playback apparatus. Still further, it is appropriate that a switch changeable from an external is provided in the data playback apparatus so as to perform the switching operation between a normal mode and a high-speed mode and the control unit reproduces the recording medium at a high speed only when the switch takes the high-speed mode and the data are supplied to the processing unit. In this case, the state of this switch may be read by means of the microprocessor 171.

In addition, although in the third embodiment the RAM 85 is provided to be independent from the image memory 90, function of the RAM 85 can be realized by the image memory 90 with an arrangement being made so as to allow the direct access from the microprocessor 176 to the image memory 90. In this case, the image memory 90 not only acts as the image memory within the image output unit but also acts as the buffer in the processing unit. Moreover, although in the embodiments the description has been made in terms of the CD-ROM, the recording medium is not limited to the CD-ROM, but it is possible to use any recording medium such as DAT and LD-ROM from which data can continuously be read out at a predetermined transfer speed.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention.

What is claimed is:

1. A data playback apparatus for reproduction of data recorded in a recording medium, comprising:
    reproduction means for reproducing said data from said recording medium and outputting the reproduced data;
    selection means coupled to said reproduction means for selectively supplying said data, outputted from said reproduction means, to one of a first destination and a second destination;
    processing means, being the first destination of said data to be supplied by said selection means, coupled to said selection means for once storing therein the data supplied from said selection means during a time when said selection means supplies the data said reproduction means reproduces from said recording medium to said processing means and, after completion of data supply from said selection means, processing and/or outputting the data stored therein;
    at least one output means, being the second destination of said data to be supplied by said selection means, coupled to said selection means and said processing means for inputting data supplied from said selection means and the data outputted from said processing means so as to immediately convert the inputted data, in order of input, into a form which is to be outputted from said data playback apparatus; and
    control means coupled to said processing means, said processing means instructing said control means as to a destination of said data outputted from said reproduction means, and said control means further coupled to said reproduction means and said selection means for controlling said reproduction means and said selection means, wherein
    when said processing means indicates that the destination of said data to be outputted from said reproduction means is said at least one output means, said control means controls said reproduction means so that the data is reproduced from said recording medium at a first predetermined constant reproduction speed and controls said selection means so that the data outputted from said reproduction means is supplied to one of said at least one output means, and
    when said processing means indicates that the destination of said data to be outputted from said reproduction means is said processing means, said control means controls said reproduction means so that the data is reproduced from said recording medium at a second reproduction speed higher than said first predetermined constant reproduction speed and controls said selection means so that the data outputted from said reproduction means is supplied to said processing means.

2. The data playback apparatus as claimed in claim 1, wherein said recording medium has a disc-like configuration and has thereon tracks having one of either coaxial and spiral configurations in which said data are recorded at one of either an angular velocity and a linear velocity, and when the data is reproduced from said recording medium at said second reproduction speed, said one of either angular velocity and linear velocity is more increased as compared with when reproducing the data from said recording medium at said first reproduction speed.

3. The data playback apparatus as claimed in claim 1, wherein an application program is recorded as data in said recording medium, and said processing means is equipped with a read-only memory in which a basic program is stored, microprocessor means, and a write-allowable memory in which said application program is written from said recording medium, and said microprocessor means executes said basic program and said application program to instruct said control means to supply the data in said recording medium to one of either said output means and said processing means.

4. The data playback apparatus as claimed in claim 1, wherein, when reproducing the data from said recording medium at said second reproduction speed, said control means controls said reproduction means so that the data is reproduced from said recording medium at a reproduction speed designated by said processing means.

5. The data playback apparatus as claimed in claim 1, wherein said apparatus further comprises mode-changing switch means switchable from an external for performing a switching operation between a normal mode and a high-speed mode, and said control means controls said reproduction means to reproduce the data from said recording medium at said second reproduction speed only when satisfying two conditions, one of said two conditions being that said mode-changing switch means takes said high-speed mode and the other condition being that said processing means instructs said control means so that the data in said recording medium is supplied to said processing means.

* * * * *